T 860,021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1009

695,830

STABILIZED ESTER LUBRICANTS

Theodore J. Peters, Readington Township, Hunterdon County, N.J. (County Line Road, R.F.D. 3, Somerville, N.J. 08876), and John F. Collins, deceased, late of Ventnor, N.J., by Muriel A. Collins, executrix, 110 S. Cambridge Ave., Ventnor, N.J. 08406

Filed Jan. 3, 1968. Published Mar. 25, 1969

Class 252—56

No Drawing. 15 Pages Specification

Synthetic-ester-type lubricants, particularly those intended for aircraft gas turbine lubrication, are improved with respect to stability in storage by incorporating therein from about 0.1 to about 10 weight percent of an epoxide of an unsaturated fatty oil or unsaturated fatty ester having from one to ten epoxy groups per molecule. The ester that is epoxidized can be a $C_1$ to $C_{20}$ monohydric, dihydric, or trihydric alcohol ester of an unsaturated fatty acid of from 12 to 20 carbon atoms or a $C_{12}$ to $C_{20}$ unsaturated aliphatic alcohol ester of a $C_1$ to $C_{20}$ fatty acid. Examples of epoxidized oils or esters include: epoxidized soybean oil having an average of about 5.3 epoxy groups per molecule; epoxidized decyl oleate having one epoxy group per molecule; and diethylene glycol diepoxy stearate. Ester type lubricants improved by these additives include: octyl decyl adipate; a mixture of the di-2-ethyl hexyl ester of sebacic acid and a complex ester obtained by reaction of the 2-ethyl hexyl half ester of sebacic acid with polyethylene glycol; and a mixture of octyl decyl adipate and di(2-ethyl hexyl) sebacate.